United States Patent
Srikantiah et al.

(10) Patent No.: US 7,936,846 B2
(45) Date of Patent: May 3, 2011

(54) LOW GATE COUNT SEQUENTIAL MULTITAP CORRELATOR

(75) Inventors: Muralikrishna Srikantiah, Bangalore (IN); Nagaraj Channarayapatna Shivaramaiah, Bangalore (IN)

(73) Assignee: Accord Software & Systems Pvt. Ltd., Bangalore (IN)

( * ) Notice: Subject to any disclaimer, the term of this patent is extended or adjusted under 35 U.S.C. 154(b) by 779 days.

(21) Appl. No.: 11/628,707

(22) PCT Filed: Jul. 5, 2004

(86) PCT No.: PCT/IN2004/000196
§ 371 (c)(1),
(2), (4) Date: Dec. 5, 2006

(87) PCT Pub. No.: WO2006/003673
PCT Pub. Date: Jan. 12, 2006

(65) Prior Publication Data
US 2008/0069189 A1   Mar. 20, 2008

(51) Int. Cl.
*H04L 27/06* (2006.01)
*H04B 1/00* (2006.01)
*H04B 7/185* (2006.01)
*H04H 20/74* (2008.01)

(52) U.S. Cl. ........ 375/340; 375/343; 375/316; 375/150; 455/3.02; 455/12.1

(58) Field of Classification Search ............ 375/142, 375/143, 150, 152, 219, 220, 316, 343, 340; 455/3.02, 12.1
See application file for complete search history.

(56) References Cited

U.S. PATENT DOCUMENTS

| | | | |
|---|---|---|---|
| 5,987,059 A * | 11/1999 | Harrison et al. | 375/150 |
| 6,346,911 B1 * | 2/2002 | King | 342/357.62 |
| 6,392,458 B1 * | 5/2002 | Miller et al. | 327/158 |
| 6,788,731 B2 * | 9/2004 | Kim et al. | 375/142 |
| 7,336,696 B2 * | 2/2008 | Akopian et al. | 375/134 |
| 7,471,717 B2 * | 12/2008 | Huang | 375/150 |
| 2001/0043644 A1 * | 11/2001 | Dooley et al. | 375/150 |
| 2002/0077751 A1 * | 6/2002 | Mieno et al. | 701/213 |
| 2002/0122511 A1 * | 9/2002 | Kwentus et al. | 375/343 |
| 2003/0223477 A1 * | 12/2003 | Loomis et al. | 375/147 |
| 2004/0120385 A1 * | 6/2004 | Mattos et al. | 375/148 |
| 2004/0202235 A1 * | 10/2004 | Kohli et al. | 375/150 |
| 2005/0010362 A1 * | 1/2005 | Dong-Sik | 701/213 |

* cited by examiner

*Primary Examiner* — David C Payne
*Assistant Examiner* — Linda Wong
(74) *Attorney, Agent, or Firm* — Ash Tankha; Lipton, Weinberger & Husick

(57) ABSTRACT

A system and method of achieving a reduced time for first fix in a global positioning system receiver (GPS). The GPS receiver includes a low gate count sequential multitap correlator (102) in combination with a digital signal processor (106) and a down converter (101). The low gate count sequential multitap correlator (102) conducts sequential correlation on the incoming GPS signals using a multitapping and pipelining scheme. The multitapping process involves tapping the shift register and simultaneously correlating the signal samples and tapped chips. The pipelining process includes sampling data, mapping incoming samples, shifting carrier acquisition code, multiplying and accumulating the code and signal products. The digital signal processor conducts the frequency search.

7 Claims, 5 Drawing Sheets

| CLOCK CYCLE 1 | CLOCK CYCLE 2 | CLOCK CYCLE 3 | CLOCK CYCLE 4 | CLOCK CYCLE 5 |
|---|---|---|---|---|
| A(0) B1(0) C1(0) | A(1) B1(1) C2(0) C1(1) C2(0) | A(2) B1(2) B2(1) C(0) C1(2) C2(1) C3(0) | A(3) B1(3) B2(2) C(1) C1(3) C2(2) C3(1) D(0) | A(4) B1(4) B2(3) C(2) C1(4) C2(3) C3(2) D(1) E(0) |
| A-SAMPLE DATA B-CARRIER GENERATION B1- CARRIER NCO B2- SINE/COS MAP C-CODE GENERATION C1-CODE CLOCK GENERATION C2-C/A CODE GENERATION C3- CODE SHIFT D- CODE MIXING E-ACCUMULATION | | | | |

FIGURE 5

LOW GATE COUNT SEQUENTIAL MULTITAP CORRELATOR

TECHNICAL FIELD

This invention relates to a global positioning system (GPS) receiver, specifically to an accelerator device in combination with a digital signal processor and also to a sequential time domain correlation method carried out therein.

BACKGROUND ART

Wireless assisted GPS systems with emerging E911 compliance standards require reduced acquisition time in GPS receivers. The user's location information needs to be accurately communicated in the shortest possible time to emergency support providers. If the location data is not accurate, the emergency dispatchers may experience difficulty in routing 911 calls to the appropriate center. Mobile phones also need to be operable indoors and in urban canyons. Today's GPS systems also need to have the capability to handle weak signals and respond with both speed and location accuracy. For example, E911 compliance requires that the object be identified within 125 meters and within a 5 second span in most instances.

The conventional method to determine time to first fix (TTFF) is through the use of multiple hardware blocks. TTFF performance is dependent on the correlation acquisition process. For example, incoming GPS signals from twelve respective satellites are channeled to twelve hardware blocks partitioned in the correlator. The twelve hardware blocks then perform the correlation exercise in parallel. The above conventional approach faces significant challenges. The use of twelve hardware blocks increases the gate count of the device. This in turn increases the size of the correlator device and hence the overall real estate of the GPS receiver. There is a strong industry move towards GPS integration in automotive and handheld applications. These applications demand a small form factor GPS receiver. However, if an attempt is made to design a higher gate count device in a smaller form factor hardware block, the cost and complexity of the design increases.

In the frequency domain correlation approach, there is a trade-off between the ability to detect weak signals and to improve acquisition time. The strength of the signal determines the necessary length and period of the signal that needs to be analyzed. For weak signals, the data length required for analysis increases. However, when the length of data increases, the frequency of the correlation operation decreases. This in turn increases the acquisition time of the signal.

Hence, it is not possible to overcome the aforementioned tradeoff between signal strength, acquisition time and gate count if the conventional time domain or frequency domain approach and conventional sampling method is used. The correlation analysis is performed either in the time domain through convolution, or in the frequency domain through Fourier transform. The correlation operation is performed repeatedly in fixed periods for every new incoming data point. This invention optimizes this sampling procedure to allow a longer data input string to be taken with multiple data points and by allowing the sampling operations to be performed simultaneously on multiple data points in the data string. "Correlation" between two series implies the multiplication of the elements of one series with the elements of the other, the result being a single value. "Convolution" between two series implies creating a third series by filtering the second series using a filter, corresponding to that of the first series.

Consider two signals, one received from a satellite and the other from a locally generated reference signal. A "correlation" between the two signals is a measurement of similarity between the signals obtained by multiplying the two sequences together and summing the result in an accumulator. The incoming signals are decomposed into in-phase and quadrature components prior to the correlation process. If correlation takes place for "n" samples of a given signal, the "n+1" samples of two signals can be multiplied and added to the previous result of the correlation of "n" samples. This repetitive process is referred to as "updating" of the correlation. This updating process continues until a final result is obtained to compare with a threshold or for further processing. Next, the correlation process starts for a new set of values. This process of integrating the product of samples of two signals for a finite duration is termed as "integrate and dump".

In most applications, the relative phasing between an incoming data sequence and a locally generated sequence needs to be determined. A series of correlation operations are performed between the incoming signal and a set of shifted versions of locally generated code signal. A particular relative phasing between two sequences is termed a "lag", where this term comes from its relation to delay. The correlation operation consists of shifting to the right by 1 for each lag, point wise multiplying and finally summing the results.

Hardware correlators are used in GPS receivers to perform the correlation process. The correlator is connected between a Radio Frequency Down Converter and a base band processor. The base band processor can be either an Advance Risk Machine (ARM) processor or a Digital Signal Processor (DSP).

The architecture of the correlator determines the TTFF performance of the receivers. Typically, conventional receivers with a very low gate count of approximately 150K gates to 200K gates achieve TTFF of approximately 70 seconds to 80 seconds under normal signal conditions. As discussed above, this is not sufficient to meet the requirements of the new applications in the market. Other architectures overcome this problem using Fast Fourier Transform (FFT) based correlators. But the gate count of these correlators is of the order of 400K gates and above.

Typically, multitap correlation in a parallel processing scheme increases correlator hardware complexity. For example, for a 10-chip multitap, each chip requires 4 accumulators. A total of 40 accumulators would therefore be required per channel. But with 12 channels using the multitap in parallel, there is a need for 480 accumulators. The large number of accumulators increases the gate count of the GPS receiver. This invention uses a sequential multitap correlation process that significantly reduces the number of accumulators and hence reduces the overall gate count.

The integration time of a GPS receiver determines the maximum frequency range that can be searched. For example, for an integration time of one millisecond, the maximum frequency that can be detected is 500 Hz. This invention increases the frequency range of the signals that can be searched by decreasing the integration time.

There are different stages to a GPS reception. In a cold start, the GPS correlator does not have a prior estimate of the frequency shifts of the incoming signals. Whereas, in the case of a warm start, the GPS receiver already has an estimate of the Doppler frequency. Typically, a correlator has a cold start of 75 seconds, a warm start of 45 seconds and a hot start of 10 seconds. There is a market need to reduce these start periods in new market applications.

The GPS receivers use RF down converters that possess a reference clock. If there is a shift in reference clock, there will be a corresponding shift in the frequency detected for the incoming signal. A sub-optimal oscillator with an inherent clock frequency shift causes problems for warm starts. In a warm start, it is difficult to determine the incoming signal's carrier frequency and the frequencies must be searched for a wider range of frequencies.

Customers today require a low gate count GPS receiver with a reduced time for first fix. To achieve this, the number of accumulators used in the GPS receiver must be reduced. The ability to detect weak signals in a reduced time for first fix is also a strong market need.

DISCLOSURE OF INVENTION

It is therefore an embodiment of the invention to provide an implementation of an E911 compliant GPS receiver that achieves reduced TTFF without significant increase in gate count of the hardware. In the proposed system, the digital signal processor performs the frequency estimation, where as the low gate count sequential multitap correlator conducts the partial time delay correlation using a multitap sequential scheme. The system comprises of a 12 channel GPS correlator with a serial communication interface. The correlation process is implemented using a five stage pipelined architecture. The hardware correlator is connected between a radio frequency down converter and a base band processor. The base band processor can either be an ARM processor or DSP. The low gate count correlator hardware conducts the time delay correlation and transfers the data to the DSP. The DSP then undertakes the frequency search. The serial communication manager achieves the interface with the optimized correlator block.

Another embodiment of the invention provides an achievement of a low TTFF using a low gate count hardware correlator device. For example, a TTFF of about 40 seconds can be achieved with a gate count of less than 120K. The low gate count hardware devices can therefore be packaged in small pin count packages.

Yet another embodiment of the invention provides a dedicated hardware resource of a single correlator that is time shared among multiple GPS channels during the tracking part, thereby allowing tracking to be accomplished utilizing the same hardware with elimination of additional resources.

Yet another embodiment of the invention provides better performance conditions in terms of low TTFF even under low strength signal conditions.

Yet another embodiment of the invention provides improved acquisition performance for automotive GPS receivers in mobile applications. Reduced acquisition and reacquisition timings are achieved even in areas of significant foliage, urban canyons and in-building applications.

Yet another embodiment of the invention provides a method of power management for a GPS receiver. The required operating frequency of the correlator is reduced with resampling correlator architecture to the minimum frequency required. This ensures that the power consumption does not increase with the time multiplexing of a single hardware resource, compared to existing parallel correlator architectures.

Yet another embodiment of the invention provides a method for reducing hardware complexity of the correlator. The sequential mode of correlation for the 12 incoming channels considerably reduces the number of accumulators that are required. For example, a 10 chip multitap correlator with 4 accumulators per chip when employed in sequential correlation requires only 40 accumulators. This results in a low gate count correlator hardware device.

Yet another embodiment of the invention provides a method of increasing the range of frequencies than can be searched in the GPS receiver. The code mixer output is integrated within a shorter duration of time. The processed samples are then transferred to the DSP. Hence, reducing the duration of integration will result in widening the range of frequency searches.

Yet another embodiment of the invention provides reduced timings for cold, warm and hot starts. The sequential multitap scheme of this invention reduces the cold start to approximately 42 seconds, warm start to approximately 30 seconds and hot start to approximately 9 seconds.

Yet another embodiment of the invention provides a method of obviating the need to use a sophisticated and expensive oscillator to maintain stability. Use of a faster rate of sampling for correlation enables a search across a wider range of frequency ambiguities. The faster rate of sampling provides compensation for any offset in the local carrier generation. Hence, it is possible to use an inexpensive normal TCS source instead of opting for expensive stable oscillators.

BRIEF DESCRIPTION OF DRAWINGS

The above and further advantages of this invention can be understood by referring to the following drawings in conjunction with the accompanying description, in which like numerals indicate like structural elements and features in various figures.

FIG. 5 further illustrates the five stage pipelining process.

MODES OF CARRYING OUT THE INVENTION AND DETAILED DESCRIPTION

Figure 1:
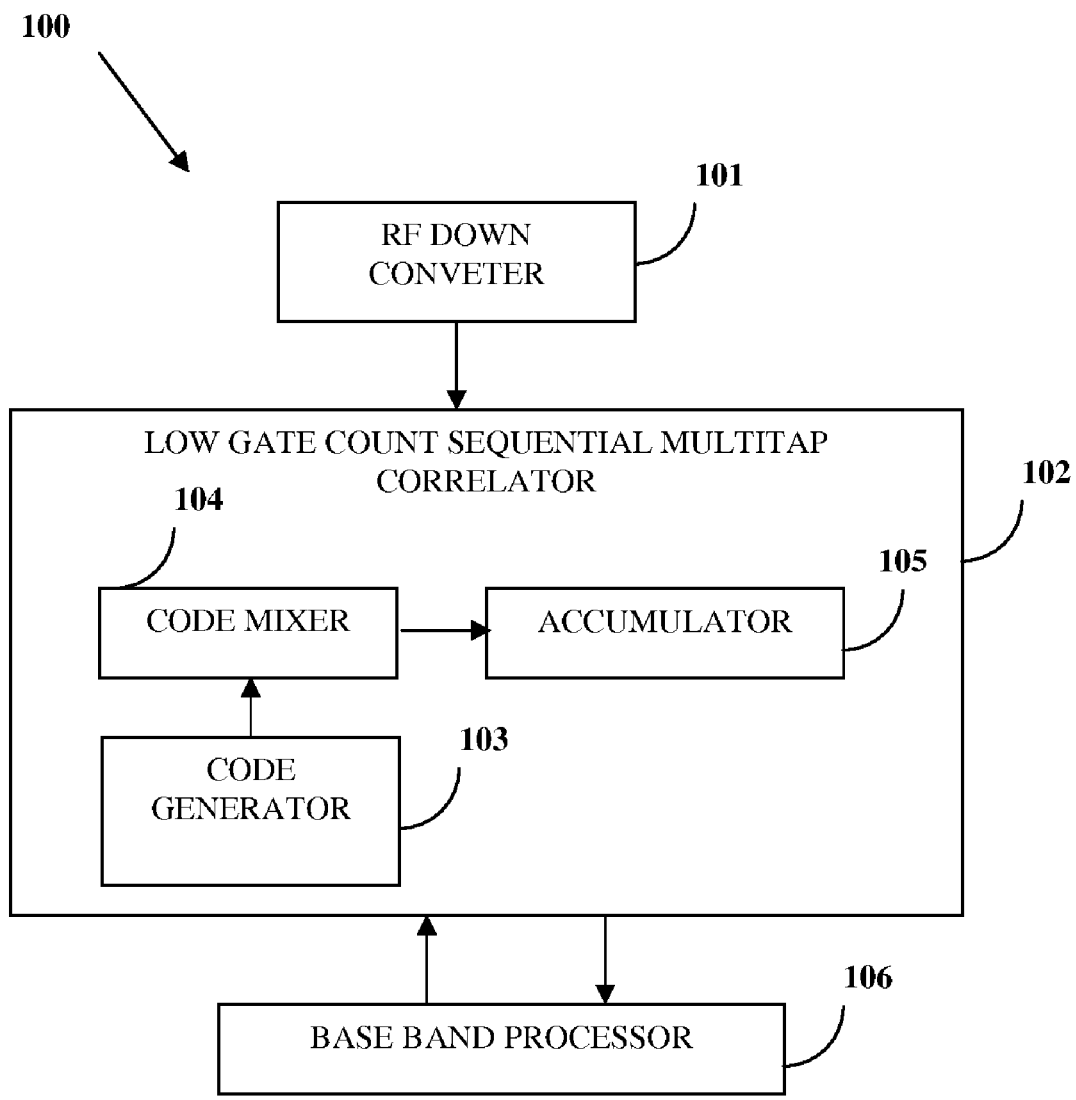
FIG. 1 illustrates a GPS receiver comprising a radio frequency down converter, correlator and DSP/ARM.

FIG. 1 illustrates a general block diagram of a GPS receiver system 100. The main components of the system are RF down converter 101, low gate count sequential multitap correlator 102 and base band processor 106. RF down converter 101 receives the satellite band pass signal and converts it into a base band signal. The low gate count sequential multitap correlator 102 is connected to the RF down converter 101. The generated base band signal is the input for the low gate count sequential multitap correlator 102. The low gate count sequential multitap correlator 102 performs the time domain correlation of the intermediate frequency signals generated from the RF down converter 101. The low gate count sequential multitap correlator is a single hardware block that sequentially performs the correlation operation using a multitap scheme. The correlation is performed relatively faster in the low gate count sequential multitap correlator when compared to correlation speed in a high gate count parallel processing correlator. The main functional blocks in a correlator block 102 are the code generator 103, code mixer 104 and accumulator 105. The code generator 103 generates a pseudo random noise sequence. The code mixer 104 is responsible for mixing of the incoming data samples and the locally generated code. The invention provides a method of increasing the range of frequencies than can be searched in the GPS receiver. The code mixer output is integrated within a shorter duration of time. The processed samples are then transferred to the DSP. Hence, reducing the duration of integration will result in widening the range of frequencies that can be searched. The product from the code mixer is then provided to the accumulator 105, which then performs the "integrate and dump" operation.

The processed signal from the low gate count sequential multitap correlator is then transferred to the base band processor 106. The base band processor 106 could either be a digital signal processor (DSP) or advanced risk machine (ARM). The base band processor 106 derives the frequency characteristics of the signal.

Figure 2:
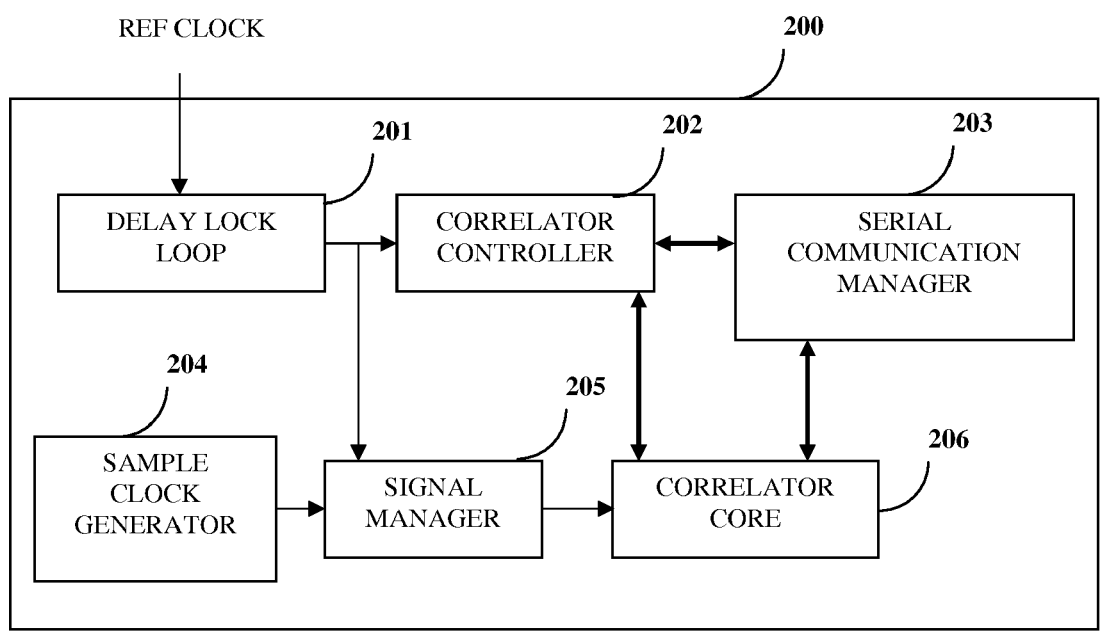
FIG. 2 illustrates the components of the correlator block.

FIG. 2 illustrates a correlator system block diagram 200 and shows the interfaces among its different components. The below mentioned numeral values used for the sampling frequency and clock frequency should not be construed as restricting the claims of this invention. They are only provided to exemplify the working of the system.

For 12 channels, with a sampling frequency of around 6.5 MHz, a clock greater than 78 MHz is required. Hence, a processing clock of 80 MHz is chosen and implemented. The correlator accepts a reference clock from the radio frequency (RF) front end for generating the sampling clock in the sample clock generator. As a second option, the RF can directly provide the sampling clock to the correlator. If the input is a reference clock, a 32-bit NCO is used to generate the sampling clock. Delay lock loop DLL 201 generates the required frequency for the accelerator to operate.

The Signal Manager 205 manages 250-microsecond worth of 2 bit incoming signal in a dual programmable random access memory (DPRAM) 205. The incoming signal is stored at a sampling clock rate and read at sys_clk rate. The signal manager 205 has two units to store 125-microsecond duration of incoming signal. While data is stored in one unit data, data is read and processed from the other unit. When one unit is filled, a signal is generated which marks the end of 125-microsecond time interval. But within this period, the data is read 12 times from the other unit and processed for all channels, leaving some guard time. The DPRAM 205 has a block random access memory (RAM) of size 2*819×2. The size is derived from 125 microseconds samples with 6.552 MHz sampling, each requiring 819 bits.

The correlator Core 206 receives the processed signal form Signal Manager 205. The correlator Core 206 comprises of a code generator 103, code mixer 104, accumulator 105 and code store unit. The code store unit is a status memory that stores channel parameters. This is needed because a single correlator core 206 is time shared between 12 channels. The correlator core 206 processes 125 microseconds worth incoming signal in approximately 10 microseconds. Hence, within 125 microseconds, all 12 channels act on the same incoming signal. The correlator core 206 plays a major role in channel switching after the data processing of a channel is completed. The channels state is stored in the status memory and status of the next channel is retrieved. The correlator core 206 stores all NCO phase contents, satellite number, register contents, code-arm, code clock, and shift register clock The core correlator 206 processes data using a pipeline procedure. There are five stages for the pipeline procedure which includes sampling data from the incoming signal, generating the carrier and generating the code clock in one cycle, mapping the incoming samples to in-phase and quadrature phase components and generating the carrier acquisition code, shifting said carrier acquisition code using a multitap correlation method, multiplying the incoming signal samples with the locally generated code and accumulating the code and signal products. The data is acted upon in these five stages to derive the correlation value.

The correlator controller 202 generates control signals to control the various operations of the correlator core 206. For example, it enables the correlator core 206 to access the signals from Signal Manager+DPRAM 205 at a predetermined time and generates control signals to start the operation of the serial communication manager 203. The serial communication manager 203 module receives data for all channels from the DSP once every 1 millisecond. At the beginning of the one-millisecond interval, this module sends 12 Receive Frame Sync pulses. Each pulse has a duration equal to 182-system clock cycle (SCLK). Data is continuously transmitted with normal framing from the serial communication manager 203. Data is sampled at the positive edge of the SCLK.

Serial communication manager 203 also transmits the measurement data of each channel every 10 microseconds. Data transmission for one channel involves transmission of 406 bits. Data is transmitted at the positive edge of SCLK.

Figure 3:
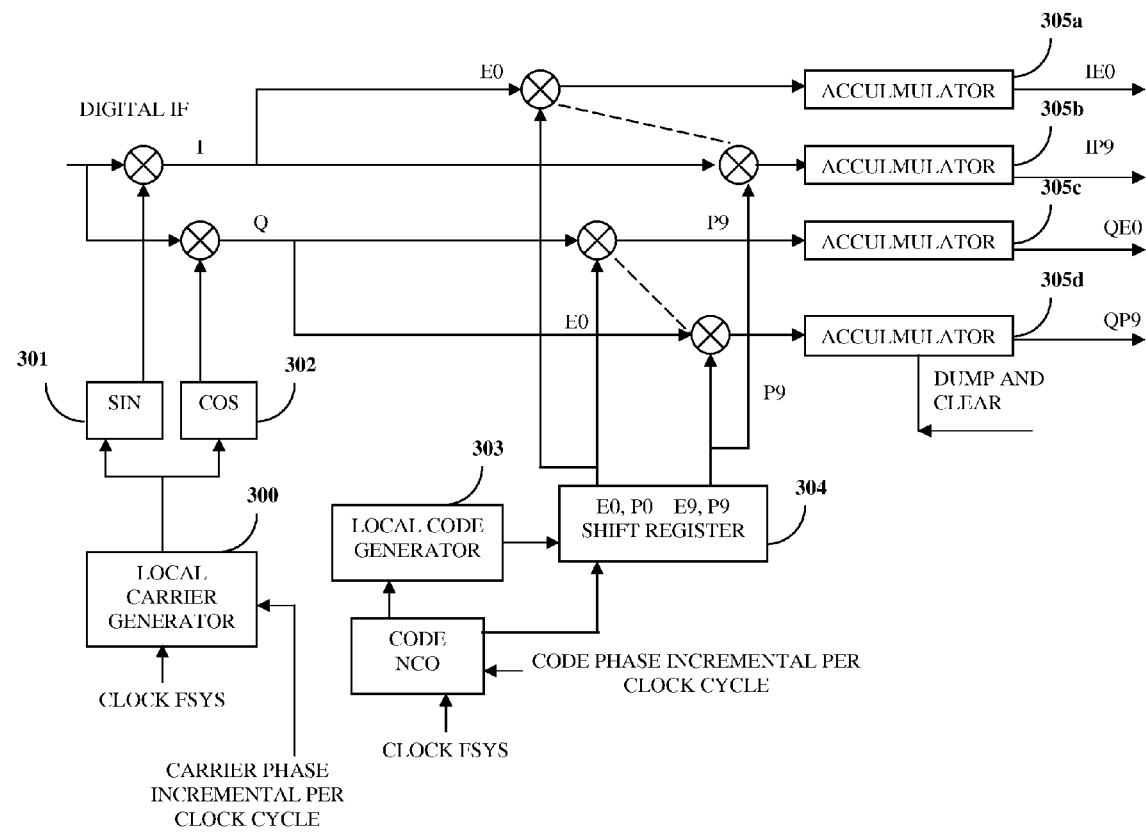
FIG. 3 illustrates the functional block of the correlator and the correlation processes.

FIG. 3 shows the functional block diagram of the correlator. The correlator consists of a single hardware block time multiplexed across all the 12 incoming channels. The digitized intermediate frequency (IF) signal from each of the 12 channels is multiplied by the sine 301 (SIN) and cosine 302 (COS) signals from local carrier generator 300 in order to derive in-phase (I) and quadrature (Q) signal components. Numerically controlled oscillator (NCO) is used to generate a signal of the desired frequency based on the IF input. These components are then multiplied by a code generated by the local code generator 303. Carrier phase and code phase are incremented per clock cycle by two separate control signals. Each multitap output is a one chip shifted code by 20-Bit Shift Register 304. As a result, there are 10 one-chip shifted codes. For each chip, there are 4 accumulators that total up to 40 accumulators in the correlator. Each multitap output is a shifted version of the code sequence, with 10 possible shifts. The low gate count sequential multitap correlator 206 is shared by 12 channels. The multiplication operation is performed on the outputs from the sequential multitap correlator core 206. The results of the multiplications are accumulated. The in-phase component I is multiplied with a shifted code E0 from shift register 304. The result IE0 is accumulated in the accumulator 305*a*. The in-phase component I is multiplied with a shifted code P9 from shift register 304. The result IP9 is accumulated in the accumulator 305*b*. The quadrature component Q is multiplied with a shifted code E0 from shift register 304. The result QE0 is accumulated in the accumulator 305*c*. The quadrature component Q is multiplied with a shifted code P9 from shift register 304. The result QP9 is accumulated in the accumulator 305*d*. The correlation values are copied to the processor interface memory and the accumulators are reset. The multitap parallel correlation operation achieves faster acquisition and reacquisition of signals.

The integrate and dump function is performed in the accumulator 305. The short duration of integration is 125 microseconds. The GPS receiver can therefore process higher frequencies and enable a wider coverage of incoming channel frequencies.

The following example illustrates the method of processing incoming GPS signals through the components of the GPS Receiver of FIG. 1. The incoming GPS signals are down converted to lower frequency signals in the down converter 101. The digitized low frequency output from the down converter 101 is the input for the correlator block 102. The correlator block performs the correlation function and feeds the output to the base band processor 106. The digitized signals are stored in the signal manager+DPRAM 205. The stored signals are then clocked at a higher rate by the delay lock loop (DLL) 201. The DLL 201 runs at a higher frequency compared to the sampling clock frequency set for the incoming radio frequency signal. Use of a faster rate of sampling for correlation enables a search across a wider range of frequency ambiguities. The faster rate of sampling provides compensation for any offset in the local carrier generation. Hence, it is possible to use an inexpensive normal TCS source instead of opting for expensive stable oscillators. The clocked outputs from signal manager+DPRAM 205 are sequentially correlated at the correlator core 206. The correlation is performed by sequentially correlating multiple signals through a multi-tap correlation scheme. The correlator 206 performs partial correlation before transferring the data to the serial communication manager. The output from the correlator is transmitted through serial communication manager 203 to a base band processor 106. In this example, the base band processor is a digital signal processor. If the required sampling clock is 4 MHz, for 12 channels, the DLL 201 generates 48 MHz enabling the single channel correlator 206 to perform the correlation sequentially for all the 12 channels. For example, if 50K (50,000) gates are required to conduct correlation for one channel, traditional correlation processing requires approximately 600K gates for 12 channels. However, the low gate count sequential multitap correlator can achieve the same performance with only 50K gates for all 12 channels.

The low gate count sequential multitap correlator also reduces the time for performing the correlation operation. For example, if a 10 chip multitapping scheme is used in the low gate count multitap correlator instead of a conventional single chip scheme, the 10 chip multitapping scheme can reduce the time to acquire the satellites by a factor of ten, thereby reducing TTFF. Conventionally, 10 taps would require about 10×12×4 correlators. However, using the sequential multitap correlator, the number of accumulators can be still maintained at 10×4, yet achieving faster TTFF. The sequential multitap scheme of this invention reduces the cold start to approximately 42 seconds, warm start to approximately 30 seconds and hot start to approximately 9 seconds.

Figure 4:
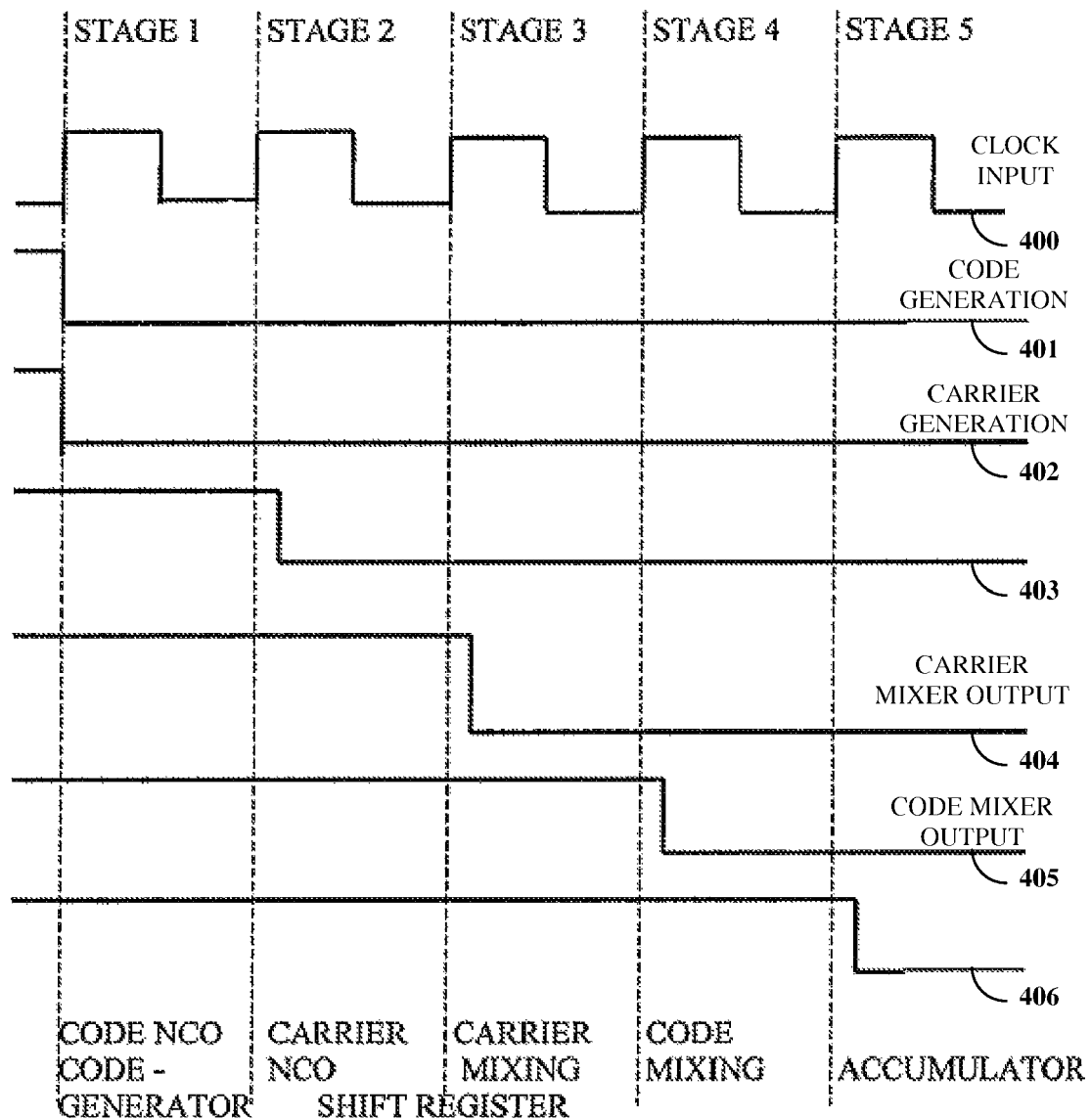
FIG. 4 illustrates the pipelining process executed in the correlator block.

FIG. 4 depicts a five-stage pipeline process of the correlator. A sequence of operations is performed on the received data to obtain a correlation value. The correlation value is transferred to the DSP. These operations include sampling received data, generation of in-phase and quadrature components, code generation, code mixing and accumulation.

The carrier mixer output and the local code are inputs to the code mixer. The accumulation operation at the accumulator follows the code mixing operation. The accumulator waits for the code mixer output. Since all these operations are performed sequentially, an optimized pipelining scheme is used for correlator processing.

Out of the five basic operations to be performed in the pipelining scheme, the local carrier generation 402 and the local code generation 401 are independent. The local code generation is performed by a code NCO. The mixer and accumulator blocks can be initiated only after the code generation 401 and carrier generation 402 activities are completed. The carrier generation is performed by a carrier NCO. The carrier mixer 404, code mixer 405 and accumulator block activities are therefore dependent on the code generation 401 and carrier generation 402 activities. The pipelining mechanism takes this dependency information into consideration while sequentially implementing the correlation process.

FIG. 5 illustrates the pipelining scheme.

A represents the sampling data, B represents carrier generation, B1 phase represents the actual carrier generation at NCO and B2 represents SIN/COS map of the carrier and the generation of in-phase and quadrature components of the received signal. C represents code generation phase of process. C1 represents the code clock generation, C2 represents C/A code generation and C3 represents code-shifting operation. D represents code mixing operation. E represents the final stage of accumulation.

The accumulator outputs a correlation value after a latency of four cycles. The correlator circuit is capable of operating at a higher frequency for a given clock frequency as compared to a non-pipelined correlator.

During the first clock cycle, operations A, B1 and C1 are performed on the first sample. In the second cycle, operations B2 and C2 are performed on the first sample and during the same cycle, processes A, B1 and C1 are performed on a second sample. In the third cycle, operation C3 is performed on the first sample, operations C2 and B2 are performed on the second sample and operations A, B1 and C1, are executed on the third data sample. During the fourth cycle, code-mixing operation D is performed on the first sample, operation C3 is performed on second sample, operations C2 and B2 are performed on third sample and processes A, B1 and C1 are performed on the fourth sample. In the fifth cycle, the first sample has reached the final stage of entering the accumulator. During this cycle, process D is performed on the second sample, operations C2 and C3 are performed on the third sample, operations D2 and B2 are performed on the fourth sample and the fifth sample undergoes the A, B1 and C1 processes. Hence by the time the accumulator outputs the processed first sample; four samples following the first sample will be at various processing stages in the pipeline.

INDUSTRIAL APPLICABILITY

The global positioning system (GPS) is widely used in civilian and military positioning, velocity, and timing applications. Wireless assisted GPS systems with emerging E911 compliance standards require reduced acquisition time in GPS receivers.

The users' location information needs to be accurately communicated in the shortest possible time span to the emergency support provider. If the location data is not accurate, the emergency dispatchers may have difficulty in routing calls to the appropriate center for example Mobile phones need to be operable indoors and in urban canyons. The conventional method to determine time to first fix (TTFF) is through the use of multiple hardware blocks that will increase the gate counts. TTFF performance is dependent on the correlation acquisition process.

The present invention is to provide an implementation of an E911 compliant GPS receiver that achieves reduced TTFF without significant increase in gate count of the hardware. It provides improved acquisition performance for automotive GPS receivers in mobile applications. Reduced acquisition and reacquisition timings are achieved even in areas of significant foliage, urban canyons and in-building applications.

We claim:
1. A global positioning system receiver comprising:
a down converter for converting a plurality of incoming global positioning system signals of N satellite signal channels into a plurality of intermediate frequency signals;
a low gate count multitap sequential correlator in communication with said down converter and sequentially time shared across said N satellite signal channels, for correlating said intermediate frequency signals with multiple locally generated chip-shifted code taps for performing parallel code search in each of said N satellite signal channels;

a base band processor in communication with said low gate count multitap sequential correlator for conducting a frequency search and detecting the carrier frequency of the incoming global positioning system signal;

whereby, the combination of the sequential processing in the low gate count multitap sequential correlator device and the frequency processing in said baseband processor reduces the overall time for first fix for the global positioning system receiver and minimizes the gate count requirement of the global positioning system by a factor of N.

2. The global positioning system receiver of claim 1, wherein said base band processor is either an advance risk machine processor or a digital signal processor.

3. The global positioning system receiver of claim 1, wherein said low gate count sequential multitap correlator comprises:
   a sample clock generator;
   a correlation controller;
   a signal manager in communication with said sample clock generator for receiving the sample clock input from the sample clock generator and supporting the management of the sample, store, read and process functions, comprising:
      a first memory bank for storing said intermediate frequency signals for a first predetermined time duration;
      a second memory bank for storing said intermediate frequency signals incoming for a second predetermined time duration while said first memory bank is read and processed;
   a correlator core in communication with the signal manager and correlation controller for determining and storing correlation values; and
   a serial communication manager in communication with the correlator core for receiving said correlation values and periodically transmitting the correlation values to said base band processor.

4. The low gate count sequential multitap correlator of claim 3, wherein said correlator core comprises:
   a code generator for locally generating psuedo random noise sequence code;
   a code store unit in communication with said code generator for storing numerically controlled oscillator phase contents, satellite number, register contents, code arm, code clock, shift register clock;
   a shift register for generating multiple chip shifted code taps in parallel using the locally generated psuedo random noise sequence code;
   a code mixer in communication with the shift register for multiplying the samples from the incoming signals with said multiple locally chip-shifted code taps of the shift register; and
   accumulators connected to said code mixer for performing an integrate and dump function.

5. A method for reducing the time for first fix in a global positioning system receiver, comprising the steps of:
   down-converting the incoming signals, each received from one of N satellite signal channels into corresponding intermediate frequency signals;
   sequentially performing the time delay correlation of said intermediate frequency signals through a pipelining process, the steps comprising;
      multitapping the intermediate frequency signals;
      multiplexing all the N satellite signal channels sequentially in the time domain with a low gate count sequential multitap correlator;
      providing a local carrier;
      multiplying the digitized intermediate frequency signal by the sine and cosine signals of said local carrier to derive in phase and quadrature signal components;
      multiplying said in phase and quadrature signal components by a locally generated code;
      incrementing the carrier phase and code phase per clock cycle by two separate control signals;
      generating multiple chip shifted code taps and correlating said in phase and quadrature signal components with said multiple chip shifted code taps for performing parallel code search in each of said N satellite signal channels, whereby achieving faster acquisition and reacquisition of signals;
      performing the correlation integration for a short time period to process higher frequency signals and also cover a wider range of frequencies; and
      accumulating the results of multiplication of the incoming signal sequence with the sequence of the local code generator and copying correlation values and resetting the accumulated values.

6. The method according to claim 5, wherein the step of said multiplexing all the satellite signal channels sequentially in the time domain comprises the steps of:
   time-sharing said low gate count sequential multitap correlator with all the satellite signal channels for correlating said intermediate frequency signals;
   storing said intermediate frequency signals for a first predetermined time duration in a first memory bank;
   storing said intermediate frequency signals for a second predetermined time duration in a second memory bank while said first memory bank is read and processed;
   performing the correlation operation by said low gate count sequential multitap correlator by alternately accessing said intermediate frequency signals from said first memory bank and said second memory bank;
   storing the correlation values; and
   retrieving the status information of the next satellite signal channel.

7. The method according to claim 5, wherein said multitapping the intermediate frequency comprises the steps of:
   tapping the shift register at different points in time, with a time gap between successive taps equal to a chip period;
   tapping the shift register multiple times to generate shifted codes for use in the correlation process in a single clock cycle; and
   correlating simultaneously the signal samples and tapped chips to reduce the overall number of possible code shifts and time consumed for the correlation with all the shifted codes.

* * * * *